J. WARD.
NUT LOCK.
APPLICATION FILED MAR. 10, 1920.
1,367,336.
Patented Feb. 1, 1921.
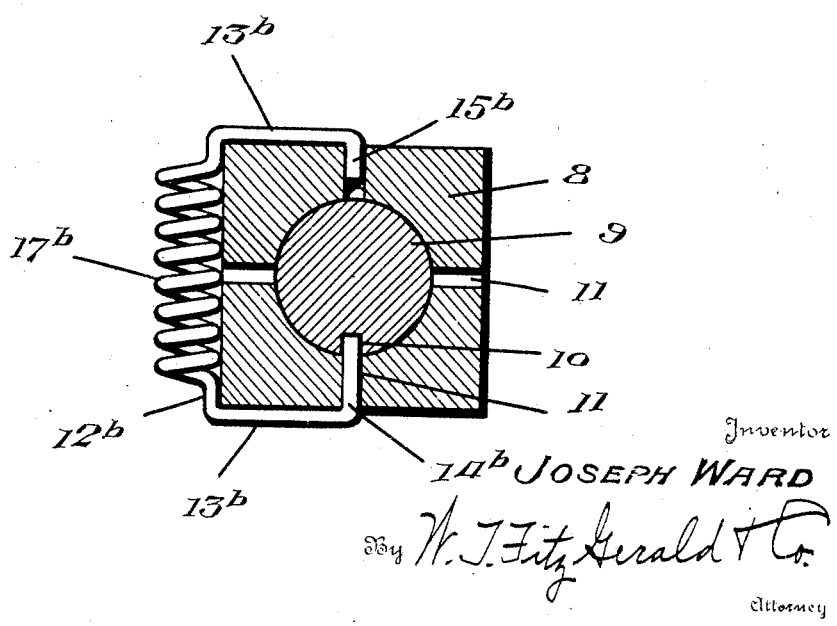

UNITED STATES PATENT OFFICE.

JOSEPH WARD, OF EAST HUNTINGTON, WEST VIRGINIA.

NUT-LOCK.

1,367,336.  Specification of Letters Patent.  Patented Feb. 1, 1921.

Application filed March 10, 1920. Serial No. 364,655.

*To all whom it may concern:*

Be it known that I, JOSEPH WARD, a citizen of the United States, residing at East Huntington, in the county of Cabell and State of West Virginia, have invented certain new and useful Improvements in Nut-Locks; and I do hereby declare the following to be a full, clear, and exact description of the invention, such as will enable others skilled in the art to which it appertains to make and use the same.

This invention relates to nut locks, and has for its object the provision of novel and improved yet simple and effective means for locking a nut on a bolt to prevent accidental loosening or turning of the nut, and including an elastic catch to snap over one side of the nut, and enter apertures therein for retaining the catch in place and also engaging the bolt to prevent the nut from turning after the catch is applied.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein the figure is a cross section of a nut and bolt showing the invention.

The numeral 8 designates any ordinary nut which is screw threaded on a bolt 9, and in carrying out the invention, the bolt is provided with a longitudinal groove 10, while the nut is provided with radial apertures 11 arranged in pairs opposite to one another, and extending from the threaded hole of the nut to the sides thereof.

The spring catch is engaged in the apertures 11 to lock the nut on the bolt, and comprises a yoke $12^b$ having a coiled retractile spring $17^b$ for pulling the arms $15^b$ of the yoke toward one another against the opposite sides of the nut with said spring bearing against one side, thereby moving the fingers $14^b$ and $15^b$ into the apertures 11, with the finger $14^b$ engaging in the groove 10 to prevent the nut from rotating. With this construction, the arms $13^b$ can be pulled apart by stretching the elastic spring $17^b$, enabling the fingers $14^b$ and $15^b$ to move longitudinally of themselves to freely move out of as well as into the apertures of the nut with a snug fit. In other words, the spring enables the yoke to be elongated or stretched with the arms $13^b$ remaining parallel and the fingers moving lengthwise of themselves. The spring will also cause the yoke to snugly embrace one side of the nut.

The groove 10 can be readily cut in the bolt and the apertures 11 readily drilled in the nut, so as to accommodate the catch, and such catch is of extremely simple and inexpensive construction and can be readily applied and removed as needed, thus providing for simplicity and cheapness, as well as efficiency.

Having thus described the invention, what is claimed as new is:

1. A resilient catch for locking a nut on a bolt, comprising a yoke to extend partially around a nut, said yoke having fingers at its ends extending toward one another to enter apertures in the nut, one of them adapted to engage the bolt, said yoke also having a coiled spring between its ends, the axis of the coil being at least approximately parallel to the fingers.

2. A resilient catch for locking a nut on a bolt, comprising a yoke to extend partially around a nut, said yoke having an intermediate portion, arms extending at an angle from said intermediate portion and fingers extending from said arms at the ends of the yoke toward one another to enter apertures in a nut, one of them adapted to engage the bolt, the intermediate portion of said yoke between said arms having a coiled spring and the axis of the coil being at least approximately parallel to said fingers.

In testimony whereof I have signed my name to this specification in the presence of two subscribing witnesses.

JOSEPH WARD.

Witnesses:
H. C. WARTH,
F. F. McCULLOUGH.